United States Patent [19]

Arend et al.

[11] 4,277,650

[45] Jul. 7, 1981

[54] SINGLE FREQUENCY TONE RECEIVER

[75] Inventors: Inez F. Arend, Mountain View; James S. Locke, Palo Alto, both of Calif.

[73] Assignee: Northern Telecom Limited, Ottawa, Canada

[21] Appl. No.: 53,826

[22] Filed: Jul. 2, 1979

[51] Int. Cl.³ ............................................. H04M 1/50
[52] U.S. Cl. .................................................. 179/84 VF
[58] Field of Search .............. 179/84 VF; 340/171 R, 340/168 R; 370/110; 328/140, 27

[56] References Cited
U.S. PATENT DOCUMENTS 3,863,030   1/1975   Mills ................................ 179/84 VF Primary Examiner—Bernard Konick
Assistant Examiner—Joseph A. Popek
Attorney, Agent, or Firm—Schwartz, Jeffery, Schwaab, Mack, Blumenthal & Koch

[57] ABSTRACT

A tone receiver indicates the presence of a PCM tone signal in a bit stream of PCM signal samples. Predetermined characteristics in a consecutive series of PCM signal samples are used to define an interval which begins in response to at least two consecutive ones of the PCM samples being received which are of one polarity and meet a magnitude threshold. The interval ends after at least two more consecutive ones of the PCM samples are received and are of the other polarity and meet a magnitude threshold. The presence of the tone signal is detected when the number of PCM signal samples received during the interval is within a predetermined range and the number of polarity changes in the PCM signal samples is less than a predetermined number. In one arrangement, the tone is indicated as having been received only after it has been detected at least a minimum number of times in a plurality of interval occurrences.

8 Claims, 5 Drawing Figures

SINGLE FREQUENCY TONE RECEIVER

The invention relates generally to tone receivers and more particularly to a receiver for the detection of a single frequency pulse code modulated (PCM) signalling tone.

In a private branch telephone exchange (PBX) there is typically a requirement that a telephone user have dialling access to the public telephone network. Access to other PBX exchanges is also often provided via private tie lines or trunks. When such access is desired in a telephone call, the calling party dials an access code, waits for a second dial tone from a connected switching facility, and dials the local number of the called party. In order for this arrangement to function satisfactorily, the calling party must pause momentarily in the sequence of dialling digits where indicated in the access code, until access to the next switching facility is indicated by the return of a plural frequency or a single frequency dial tone.

In some PBXs, the requirement of waiting for the return of dial tone is a function of the PBX, thus relieving the caller of this responsibility. This is achieved by providing a dial tone receiver which indicates to the PBX when dial tone has been received. The PBX responds to the indication by forwarding additional dialled digits.

When a digital switch is employed in the PBX, analogue signals are converted to digital form before passing through the switch and are converted back to analogue form before being sent to an analogue line. A tone receiver utilizing either a digital filter or an analogue filter is typically provided to receive the dial tone. In the case of the digital filter the PCM signals which are in compressed form, are expanded to a linear form before being applied to a digital bandpass filter and detector. In the case of the analogue filter the PCM signals are converted to analogue form before being applied to an analogue bandpass filter and detector.

The invention provides a single frequency tone receiver which detects the presence of a single tone in a PCM bit stream directly without first having to convert samples of the PCM signal to a linear digital form or to a linear analogue form.

A tone receiver in accordance with the invention includes a means for receiving PCM signal samples from a PCM bit stream. An interval defining means is responsive to a predetermined characteristic in a consecutive series of said PCM signal samples to define an interval. The interval begins with an occurrence of at least two consecutive PCM signal samples being of one polarity and at least meeting a predetermined magnitude threshold. The interval ends after an occurrence of at least two consecutive PCM samples of the other polarity and at least meeting a predetermined magnitude threshold. A detecting means detects the tone signal in response to the number of PCM signal samples received during the interval being within a predetermined range and in response to the number of polarity changes in the PCM signal samples being less than a predetermined limit.

In one arrangement the detecting means includes a first counting means for counting PCM signal samples received during the interval. A range means asserts a range signal while the count in the first counting means is within the predetermined range. A second counting means counts occurrences of polarity changes between the consecutive ones of the PCM signal samples and a limit means asserts a limit signal when the count in the second counting means is at least equal to the predetermined limit. A third counting means counts each assertion of the range signal coincident with the ending of the interval. A fourth counting means counts assertion of the limit signal, and, in an instance where during the interval there is no assertion of the limit signal or where coincident with the ending of the interval there is no assertion of the range signal, the fourth counting means counts the occurrence of the interval. An indicating means indicates the receipt of the signal tone in response to a count in the third counting means being equal to a first predetermined number and a count in the fourth counting means being less than a second predetermined number. A resetting means resets the third and fourth counters in the event of either said first or second predetermined numbers occurring.

In another arrangement, the interval defining means and the detecting means comprise a digital processor operable in accordance with a series of stored instruction words and in response to the PCM signal samples received by the receiving means.

A method for indicating the presence of a predetermined PCM tone signal, in accordance with the invention, comprises the steps of: receiving PCM signal samples from the PCM bit stream; defining an interval in response to a predetermined characteristic in a consecutive series of said PCM signal samples, the interval beginning in response to an occurrence of at least two consecutive PCM samples of one polarity which at least meet a predetermined magnitude threshold, and the interval ending in response to an occurrence of at least two consecutive PCM signal samples of the other polarity which at least meet a predetermined magnitude threshold; and detecting the tone signal in response to the number of PCM signal samples received during the defined interval being within a predetermined range and the number of polarity changes in said number of PCM signal samples being less than a predetermined limit.

In one instance the interval is defined as beginning in response to the next PCM signal sample following said two consecutive samples of the one polarity and ending in response to the occurrence of two PCM signal samples of the same polarity which at least meet said magnitude threshold and which follows said two PCM signal samples of the other polarity.

In an example, a single frequency in the range between about 350 and 500 Hz is used as a dial tone signal. In PCM format the signal is represented by a series of PCM signal samples which occur at a constant rate, typically 8 KHz. The PCM dial tone signal is detected by recognizing a consecutive number of PCM samples in a range of 16 to 23 samples which correspond to the periods of frequencies in a range of 348 Hz to 500 Hz. In practice, a valid dial tone signal may be accompanied by noise signals which must not exceed a specific level relative to the dial tone signal. Allowance is made for up to $-10$ dB of noise resident in the PCM signal samples by extending the range in one direction by one more sample to 24 samples (333 Hz) and in the other direction by two more samples to 14 samples (571 Hz).

In one arrangement of a dial tone receiver, two consecutive samples each having a positive polarity magnitude greater than a predetermined threshold indicate the beginning of an interval. The end of the interval is indicated by two more samples each having a positive polarity magnitude in excess of the predetermined threshold which follow two samples each having a negative polarity magnitude greater than a predetermined negative threshold. When at least seven polarity changes in the samples occur during the interval or when the number of said samples is outside the range of 14 to 24 samples, receipt of dial tone is not indicated. When the number of samples received during the interval is in the range of 14 to 24 samples and less than seven polarity changes have occurred, receipt of dial tone is indicated.

Example embodiments of the invention will now be described with reference to the accompanying drawings in which.

The structure and operation of the example embodiments will become apparent with reference to the following functional description and the accompanying drawings. In reference to FIGS. 1 and 2 it should be understood that the various circuit blocks will normally have clock signal leads and power leads connected thereto. Also, operation of the example embodiments is typically, although not necessarily, in association with a switching facility from which the various signals illustrated in FIG. 3 are available. However, these elements do not materially add to an understanding of the embodiments and hence are not shown or further discussed.

Figure 1:
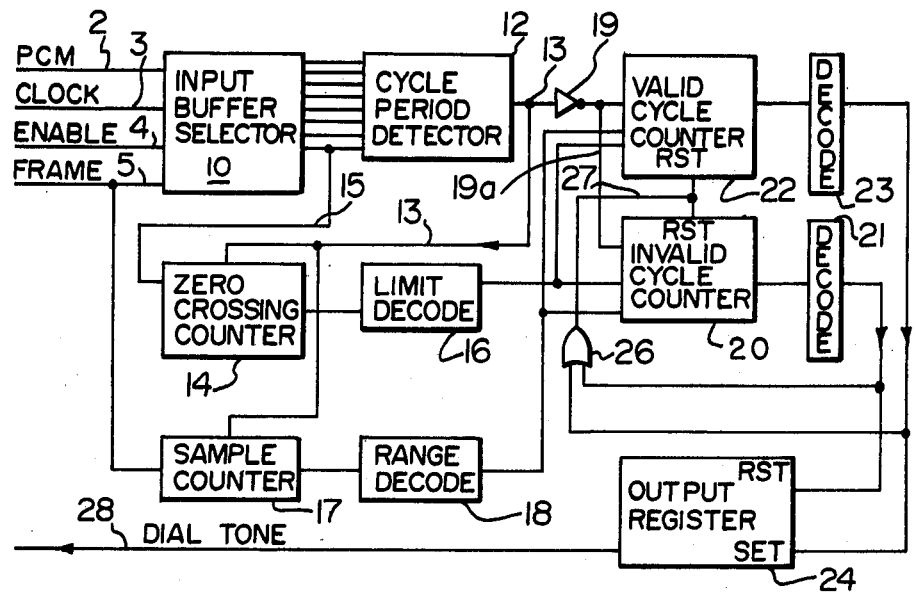
FIG. 1 is a block schematic diagram of a dial tone receiver the function of which is determined by a combination of various functional circuits.

In reference to FIG. 1, input buffer selector circuit 10 receives a time division channel of serial PCM signal samples from a bit stream of TDM PCM signals on a PCM lead 2. The PCM samples are received coincident with clock pulses on a lead 3, with the channel being selected according to the appearance of an enable pulse on an enable lead 4. The input buffer selector circuit 10 arranges each received sample into parallel format and applies the sample to the inputs of a cycle period detector 12 coincident with the occurrence of a frame pulse on a frame lead 5. The timing diagram of FIG. 3 illustrates the PCM signal format as well as the clock, enable, and frame pulses.

Figure 4:
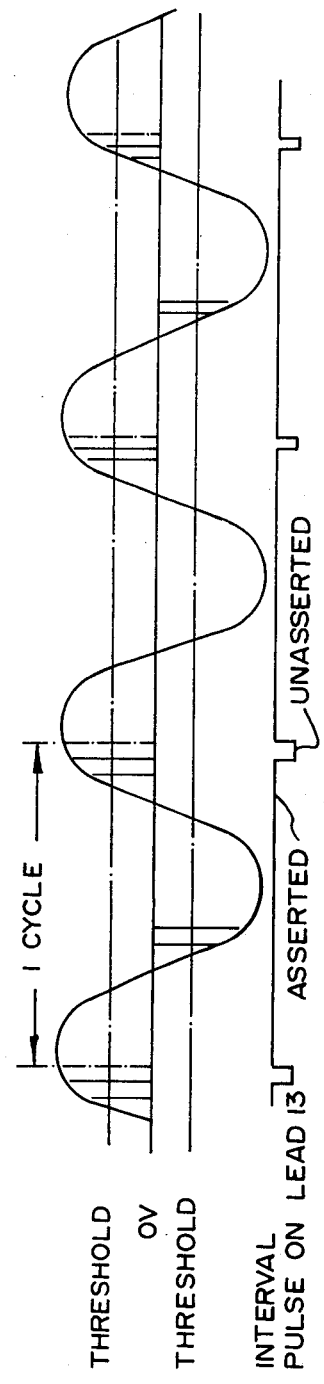
FIG. 4 is a graphical illustration of the principles of operation of the dial tone receivers in FIGS. 1 and 2.

The cycle period detector 12 generates an interval pulse at its output on a lead 13 as shown in FIG. 4. An inverter 19 includes an input connected to the lead 13 and provides an inverted cycle period pulse at its output on a lead 19a. The interval pulse is asserted upon the occurrence of a PCM sample following two consecutive PCM samples from the input buffer selector circuit 10 having a positive magnitude in excess of a preset threshold value. The interval pulse becomes unasserted when two more consecutive samples occur which exceed the positive threshold and which are received after the occurrence of two consecutive negative samples which exceed a similar but negative threshold. In one example, the cycle period detector 12 comprises two digital comparators (not shown) with hard wired thresholds which detect the negative and positive PCM signal samples respectively. Thereafter, appropriate simple logic circuits (not shown) generate the interval pulse on the lead 13 in response to consecutive detections.

A zero crossing counter 14 receives the sign bit of each PCM sample from the input buffer selector circuit 10 via a sign lead 15. The counter 14 is enabled by the cycle period pulse on the lead 13 to count changes in polarity between consecutive ones of the PCM samples as indicated by the state of the respective sign bits of the samples. A count in excess of six is determined by a limit decode circuit 16 which is connected to the output of the zero crossing counter 14. A count in excess of six causes the output of the limit decode circuit 16 to become asserted during the presence of the cycle period pulse on the lead 13. When the cycle period pulse terminates, the zero crossing counter 14 is reset to all zeros, and causes the output of the limit decode circuit 16 to become correspondingly unasserted.

A sample counter 17 counts occurrences of frame signal pulses, which it receives from the frame lead 5, during the assertion of the interval pulse which it receives from the lead 13. A count in the range of 14 through 24 is determined by a range decode circuit 18 which is connected to the output of the sample counter 17. A count in the range of 14 through 24 causes the output of the range decode circuit 18 to be asserted during the assertion of the interval pulse on the lead 13. When the interval pulse becomes unasserted, the sample counter 17 is reset to all zeros and causes the output of the range decode circuit 18 to be correspondingly unasserted.

An invalid cycle counter 20 includes an input connected to receive the inverted interval pulses from the lead 19a, an input connected to the output of the limit decode circuit 16, an input connected to the output of the range decode circuit 18, and a reset input RST connected to a reset lead 27. The invalid cycle counter counts each occurrence of an assertion of the output of the limit decode circuit 16, or in the absence of an assertion of the output of either the limit decode circuit 16 or the range decode circuit 18 it counts the end of the assertion of the interval pulse on the lead 19a. When the range decode circuit 18 output is asserted and the limit decode circuit 16 output is unasserted at the end of the interval pulse assertion, the invalid cycle counter 20 is not incremented. A count of five in the invalid cycle counter is determined by a decode circuit 21 which is connected to the output of the counter 20.

A valid cycle counter 22 includes an input connected to receive the inverted interval pulses from the lead 19a, an input connected to the output of the range decode circuit 18, an input connected to the output of the limit decode circuit 16, and a reset input RST connected to a reset lead 27. The valid cycle counter 22 is incremented by one each time the interval pulse becomes unasserted coincident with an asserted output of the range decode circuit 18. However, when the output of the limit decode circuit 16 is asserted, the valid cycle counter 22 is not incremented. A count of one in the valid cycle counter 22 is determined by a decode circuit 23 which is connected to the output of the counter 22.

An output register 24 includes a reset input RST connected to the output of the decode circuit 21, a set input SET connected to the output of the decode circuit 23 and an output connected to a dial tone lead 28. The outputs of the decode circuits 21 and 23 are connected to inputs of an OR gate 26.

Received dial tone is indicated by a signal assertion at the output of the register 24. This occurs when the output of the decode circuit 23 is asserted in response to a predetermined count in the valid cycle counter 22. The output of the register 24 becomes unasserted in response to the output of the decoder circuit 21 being asserted. The counters 20 and 22 are reset via the OR gate 26 to all zeros immediately after either of the outputs of the decode circuit 21 or 23 become asserted. Of course, as soon as the counter circuits are reset, the decode circuit outputs are unasserted leaving the dial tone receiver ready to detect dial tone again.

In reference to FIG. 4 and the foregoing description it should be noted that the interval pulse can be of a different length than that illustrated. For example, the interval pulse assertion period may be arranged to correspond to 1.5 or 2 cycles, with the limits and ranges of operation being altered accordingly.

Figure 2:
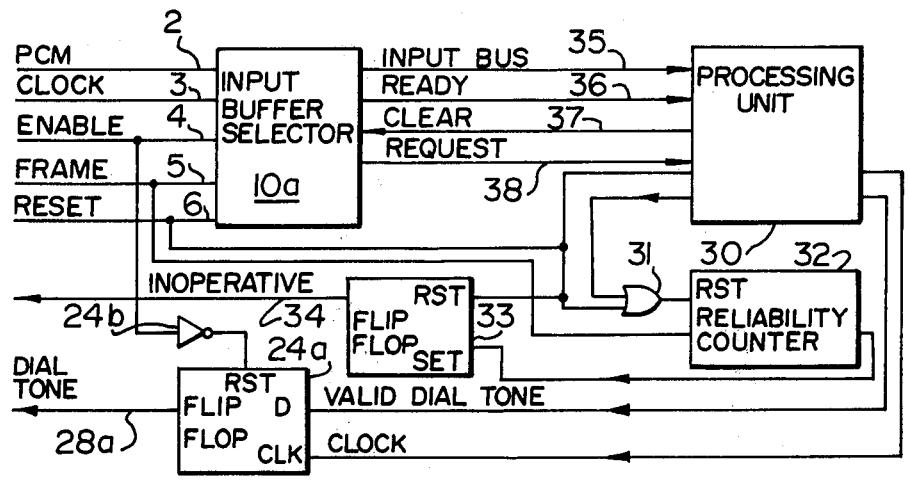
FIG. 2 is a block schematic diagram of a dial tone receiver which is similar in function to the dial tone receiver of FIG. 1 but wherein the function is substantially determined by a firmware controlled processing unit.
Figure 3:
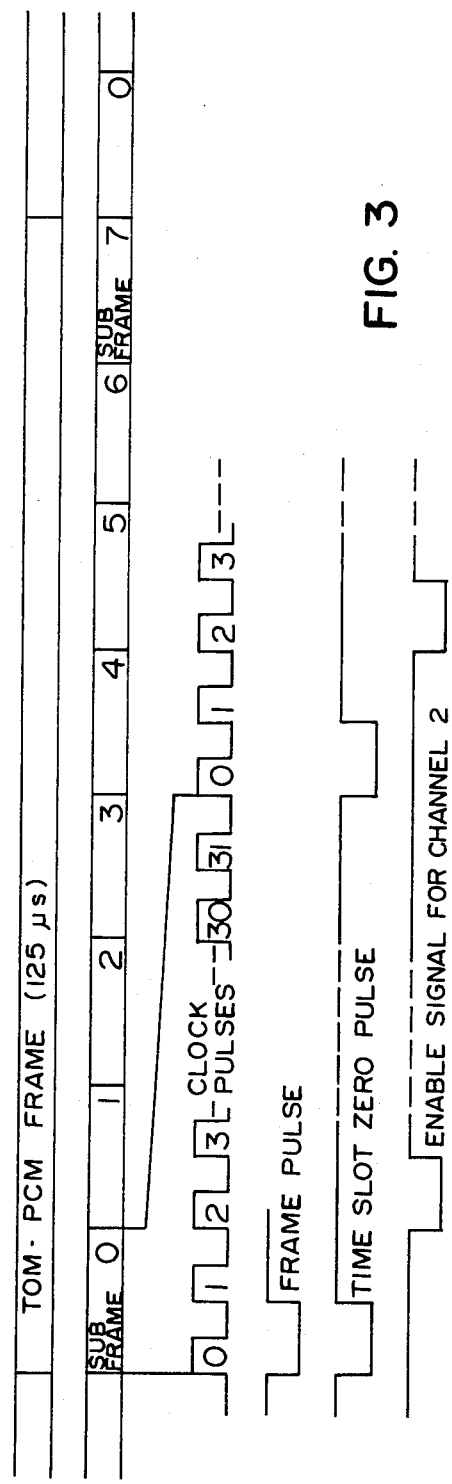
FIG. 3 is a graphical representation of various input signals used in the operation of the dial tone receivers of FIGS. 1 and 2.

The function of the dial tone receiver illustrated in FIG. 1 is essentially analogue to the function of the dial tone receiver shown in FIG. 2. However, in this embodiment, this structure for providing the function includes a processing unit 30 in combination with interface and reliability checking circuits.

An input buffer selector circuit 10a includes a reset input connected to a reset lead 6 in addition to the PCM, clock, enable and frame leads likewise illustrated in FIG. 1. As will be discussed in more detail later, the reset lead allows an associated switching facility or, for example, a repertory dialler to, at any time, return the dial tone receiver to an initialized state. The input buffer selector circuit 10a receives PCM signal samples from the PCM lead 2 as determined by clock and enable signals on the leads 3 and 4. The circuit 10a arranges the serial PCM samples into a parallel format and enters the samples into a byte wide first-in first-out (FIFO) function memory (not shown) in the circuit 10a. When a sample is ready in the FIFO for the processing unit 30, a ready signal from the FIFO function memory is asserted on a ready lead 36. When the ready signal has been registered in the processing unit 30, it asserts a signal on a clear lead 37 which causes the sample to appear on an input bus 35 connected between the selection circuit 10a and the processing unit 30. Immediately thereafter, the processing unit 30 registers the sample. The processing unit 30 then operates on the sample as discussed later, until it is ready for the next sample. When the ready signal is reasserted on the lead 36 for the next consecutive PCM sample, the above described process is repeated. By this means, the processing unit is required only to have an average processing rate at least as fast as the sample occurrence rate.

The receipt of an enable signal on the lead 4 also causes the input buffer selector circuit 10a to generate a request detection signal on a request lead 38 which causes the processing unit 30 to begin and/or continue its operation. Alternately, the request detection signal may originate directly from an associated facility with the request lead 38 being directly connected thereto or connected via an appropriate interface device. An output register 24a is provided, for example, by a D-type flip-flop having clock and valid dial tone leads connected to CK and D inputs respectively from outputs of the processing unit 30. The output register 24a also includes a reset input RST connected to the enable lead 6 via an inverter 24b, and an output connected to a dial tone lead 28a. A reliability counter 32 counts the occurrences of frame signal pulses on the frame lead 5 and is reset from time to time by the normal operation of the processing unit 30, via an OR gate 31. The counter 32 can also be reset by the appearance of a pulse on the reset lead 6 indicated via the OR gate 31. In the event that the processing unit fails to reset the counter 32, its most significant stage becomes set which in turn causes a set-reset flip-flop 33 to become set and assert a signal on an inoperative lead 34. This serves to indicate to associated equipment that the dial tone receiver is inoperative. Continued presence or reappearance of an inoperative signal assertion in spite of the receiver being reset via the reset lead, can be taken to mean that there is a permanent malfunction in the dial tone receiver requiring repair or replacement.

The operation of the dial tone receiver in FIG. 2 is of substantially the same effect as that of the dial tone receiver in FIG. 1. An example sequence of operations performed by a typical processing unit, for example an integrated circuit which includes an arithmetic logic unit, registers, and a read only memory, is illustrated in the flow chart in FIG. 5.

Figure 5:
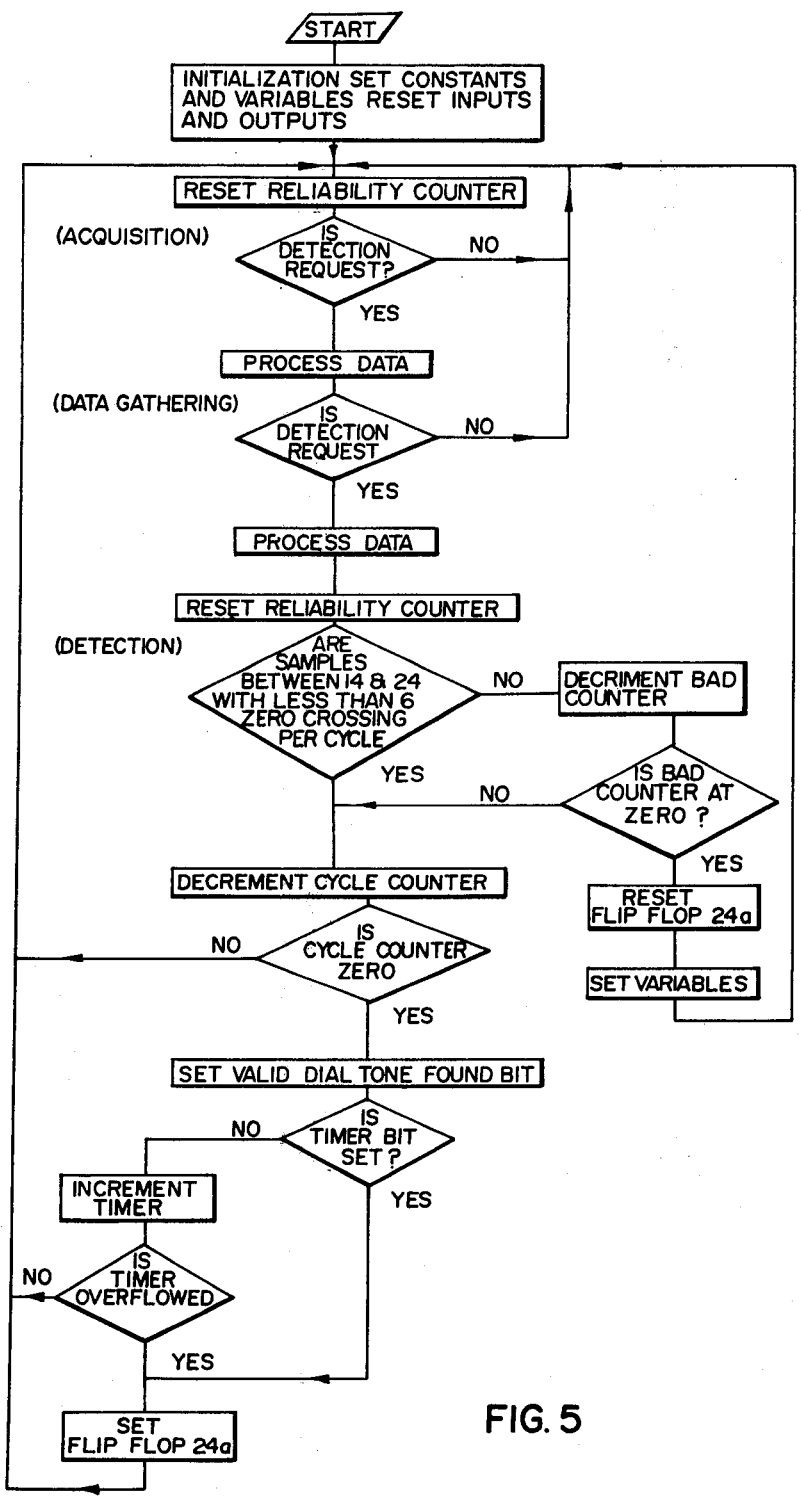
FIG. 5 is a flow chart representation of the operation of the dial tone receiver in FIG. 2.

In FIG. 5, operation starts with the application of energizing power to the dial tone receiver. This causes an initialization which sets the registers in the processing unit 30 to predetermined signal states and enables input and output ports of the processing unit 30 as required for its function. After initialization, an acquisition phase begins. The reliability counter 32 is reset and if dial tone detection is requested, a PCM signal sample is received from the input bus 35. Each sample is processed until, and including two consecutive samples are detected that are negative and at least meet a predetermined negative threshold value. The processing unit 30 continues its function until two positive consecutive samples are found that at least meet a predetermined positive threshold value. This completes the acquisition phase.

If there is still a request for dial tone detection, a data gathering phase begins in which the processing unit 30 continues to search for two consecutive negative samples meeting the threshold requirement followed by two consecutive positive samples meeting the threshold requirement. Recognition of these sample sequences in the received samples is used to determine an interval during which received samples are tabulated in the registers yielding the total number of processed samples and the number of zero crossings present during the interval.

A detection phase follows the completion of the data gathering phase. The reliability counter 32 is again reset. The contents of a pulse counter are tested to determine if the total number of samples during one interval corresponds to a frequency window in the range of 333 Hz to 571 Hz. The contents of the zero crossing register are tested to determine if its contents are less than six. If either of the window range or the zero crossing limit is violated, a bad counter is decremented. If the bad counter is decremented to zero, which equals six bad counts, the flip-flop 24a is reset and the registers in the processing unit 30 are re-initialized. If all the tests are passed and the bad counter has not been decremented to zero, a cycle counter is decremented.

When the contents of the cycle counter are zero a valid dial tone found (VDTF) bit is set in a VDTF register. If the contents of the cycle counter are not zero the BDTF register is checked to see if the VDTF bit is already set. If the VDTF bit is not set, the processing unit 30 returns to the data gathering phase. If the VDTF bit is set, a 28 milliscecond timer is checked to determine if it has timed out. When the timer is timed out, a timer bit is set and can only be reset by a termination of the detection request or by a re-initialization due to the bad counter contents reaching zero. If the timer has not timed out, its bit is not set. The timer is incremented with each received sample being processed. When the timer has timed out, the timer bit is set, meaning that dial tone has been received for at least a required period of time, for example about 50 to 100 milliseconds. This causes the flip-flop 24a to be set, indicating valid dial tone received. While the flip-flop 24a is set, the data gathering phase continues until either too many zero crossings are found, the frequency window is violated, or the detection request is withdrawn.

The dial tone receiver in FIG. 2 was constructed with a model 3870 processing unit, which is supplied with a read-only-memory. The read-only-memory of the model 3870 processing unit is written during manufacture of the device and it is therefore required that a purchaser supply the manufacturer with the data to be stored in the read-only-memory in its manufacture. Constants and variable signal states are set into various registers of the processing unit 30 as determined by an initializing portion of the data in the read only memory, with the initial signal states being determined according to the detection requirements of the tone receiver.

It should be noted that although the tone receiver is introduced as being useful in a PBX environment, it is envisaged that it will be useful in other environments, one example being, in combination with an automatic dialler for a PCM telephone.

What is claimed is:

1. A tone receiver including means for receiving pulse code modulated (PCM) signal samples from a PCM signal bit stream applied thereto, the tone receiver for indicating the presence of a predetermined PCM tone signal in the PCM bit stream, and comprising:
    means for defining an interval in response to a predetermined characteristic in a consecutive series of the received PCM signal samples, the interval having a beginning in response to the predetermined characteristic including an occurrence of at least two consecutively received PCM signal samples of one polarity and at least meeting a predetermined magnitude threshold, and the interval having an ending in response to the predetermined characteristic including an occurrence of at least two consecutively received PCM signal samples of the other polarity and at least meeting a predetermined magnitude threshold; and
    means for detecting the tone signal in response to a total number of the PCM signal samples received during the interval being within a predetermined range and in response to a total number of polarity changes in the PCM signal samples received during the defined interval being less than a predetermined limit.

2. A tone receiver as defined in claim 1 wherein the tone signal detecting means comprises:
    first counting means for counting the PCM signal samples received during the interval;
    range means for asserting a range signal in response to a count in the first counting means being within the predetermined range;
    second counting means for counting occurrences of polarity changes between the consecutive ones of the PCM signal samples received during the interval;
    limit means for asserting a limit signal in response to a count in the second counting means being at least equal to said predetermined limit;
    third counting means for counting each assertion of the range signal coincident with the ending of the interval;
    fourth counting means for counting the assertion of the limit signal and, in an instance where during the interval there is no assertion of the limit signal or where there is no assertion of the range signal coincident with the ending of the interval, for counting the occurrence of the interval;
    means for indicating receipt of the predetermined PCM tone signal in response to a count in the third counting means being equal to a first predetermined number and a count in the fourth counting means being less than a second predetermined number;
    means for resetting said third and fourth counting means in the event of either said first predetermined number occurring in the third counting means or the second predetermined number occurring in the fourth counting means.

3. A tone receiver as defined in claim 1 wherein said interval defining means and said detecting means comprise a digital processor operable in accordance with a series of stored instruction words and in response to the PCM signal samples received by the receiving means.

4. A tone receiver as defined in claim 3 further comprising register means having inputs connected to the digital processor and an output, the register means being responsive to signals from the digital processor for storing the occurrence of detection of said PCM tone signal and for indicating same at its output.

5. A tone receiver as defined in claim 3 comprising:
    means for counting each occurrence of a frame interval having PCM signal samples available to be received by the receiving means, said counting means being reset in response to an operation signal from the digital processing unit, and
    means for indicating the tone receiver to be inoperative in response to a count of at least a predetermined number occurring in the counting means.

6. A method for indicating the presence of a predetermined pulse code modulated (PCM) tone signal in PCM signal samples being received from a PCM bit stream, the method comprising the steps of:
    defining an interval in response to a predetermined characteristic in a consecutive series of the received PCM signal samples, the interval having a beginning in response to the predetermined characteristic including an occurrence of at least two consecutively received PCM samples of one polarity and at least meeting a predetermined magnitude threshold, and the interval having an ending in response to the predetermined characteristic including an occurrence of at least two consecutively received PCM signal samples of the other polarity and at least meeting a predetermined magnitude threshold; and detecting the tone signal in response to a total number of the PCM signal samples received during the defined interval being within a predetermined range and in response to a total number of polarity changes in the PCM signal samples received during the defined interval being less than a predetermined limit.

7. A method as defined in claim 6 wherein said interval is defined as beginning with the PCM signal sample following said two consecutive samples of the one polarity and ending with the occurrence of two PCM signal samples of the same polarity which at least meet said magnitude threshold and follow said two PCM signal samples of the other polarity.

8. A method as defined in claims 6 or 7 comprising the further step of indicating said predetermined tone signal as being received in response to the tone signal being detected at least a minimum predetermined number of time within a predetermined plurality of occurrences of said defined interval.

* * * * *